June 3, 1930.  M. B. MORGAN  1,761,308
TWO-SPEED GEARING
Filed July 1, 1929
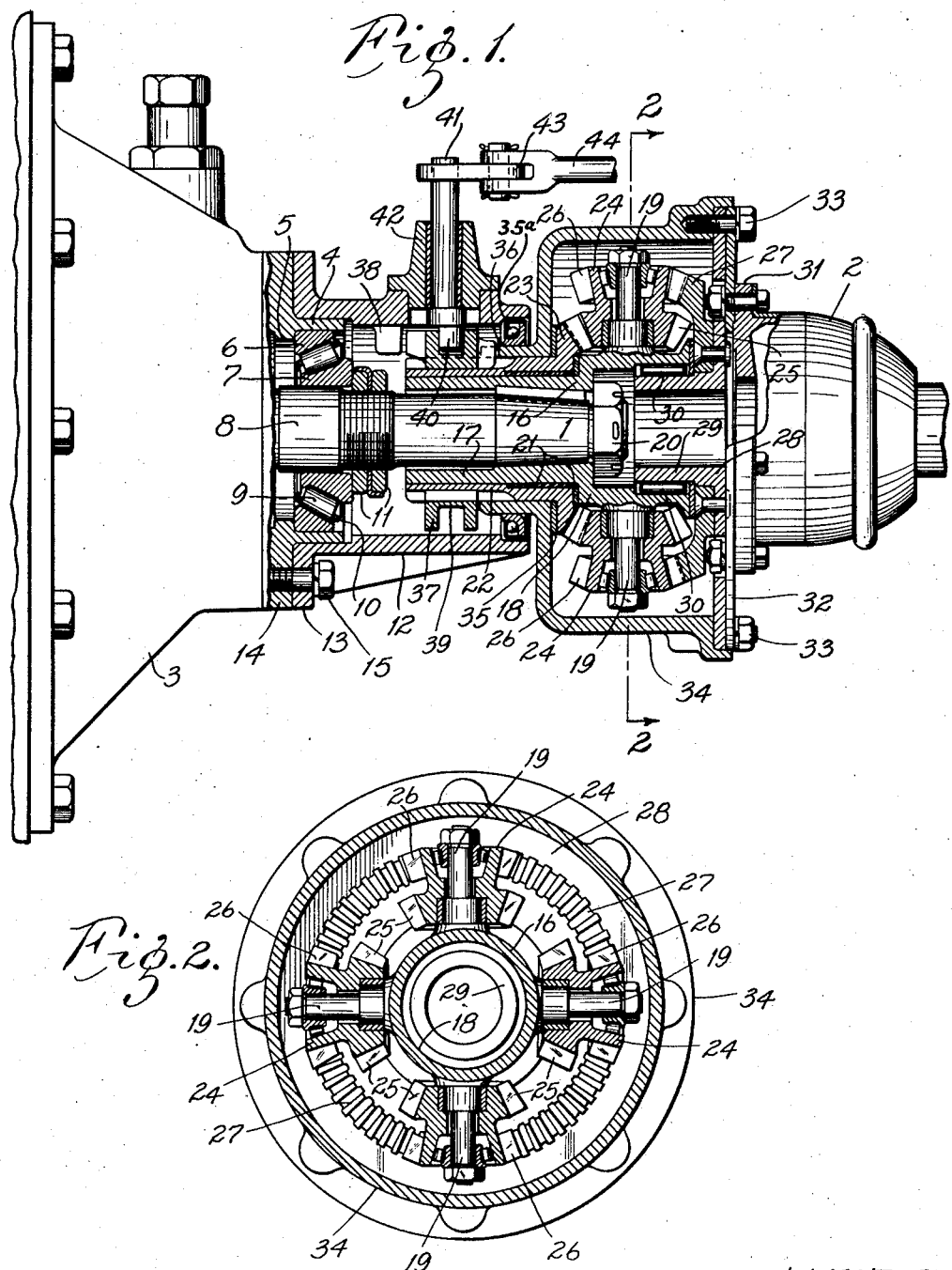
INVENTOR:
Mathew B. Morgan,
by Cam+lan +Gravely,
HIS ATTORNEYS Patented June 3, 1930

1,761,308

UNITED STATES PATENT OFFICE

MATHEW B. MORGAN, OF DETROIT, MICHIGAN, ASSIGNOR TO THE TIMKEN-DETROIT AXLE COMPANY, OF DETROIT, MICHIGAN, A CORPORATION OF OHIO

TWO-SPEED GEARING

Application filed July 1, 1929. Serial No. 375,001.

This invention relates to two-speed gearing and has for its principal objects to devise a two-speed gearing of very simple construction and capable of application at any of divers locations between the motor and the final member of the power transmission system. Another object is to suppress, so far as practicable, the tendency of the gearing to produce undue noise. The invention consists principally in arranging a driving shaft section and a driven shaft section in alinement with each other together with means whereby they may be locked together to rotate in unison or geared together to rotate at different velocities. It also consists in making the teeth of some of the differential gearing of different pitch from the pitch of other teeth so that the musical notes produced thereby will be different and the resulting noise be less. It also consists in the parts and in the arrangements and combinations of parts hereinafter described and claimed.

In the accompanying drawing which forms part of this specification and wherein like numerals refer to like parts wherever they occur, Fig. 1 is a longitudinal section of a mechanism embodying my invention, and Fig. 2 is a cross section thereof on the line 2—2 in Fig. 1.

In the accomapnying drawing, my device is illustrated as located between the propeller shaft 1 of a common bevel gear drive type of automotive axle and a universal joint 2 of any suitable type, said joint being operatively connected to a driving motor or engine (not shown). According to this drawing, the outer end of the stationary nosing 3 of a conventional type of axle housing has a circumferentially flanged mounting sleeve 4 secured thereto or integral therewith. Inside of said sleeve is an annular rib 5 whose opposite sides form shoulders or abutments for the cups or outer raceway members 6 of conical roller bearings, the cones or inner bearing members 7 being mounted on the driven shaft section 8 (which, in the drawing, is shown as the propeller shaft of the axle mechanism) with annular series of tapered bearing rollers 9 mounted in suitable cages 10 interposed between said cups and cones, all as in common construction. The forward or outer cones are adjusted and held in adjusted position by suitable nuts 11 working on a threaded portion of the propeller shaft. The mounting sleeve 4 for said roller bearings fits in a cylindrical housing 12 that has a laterally projecting flange 13 located over the flange 14 of said sleeve; and said housing 12 is secured to the nosing of the axle housing by bolts 15 that pass through the flanges of said housing and of said sleeve.

Secured on the forward or outer end portion of said propeller shaft 8, so as to turn therewith, is a spider member 16 comprising an elongated tubular sleeve or hub portion 17 that is keyed to the propeller shaft, and a hollow forwardly extending portion 18 of increased diameter which extends beyond the end of the propeller shaft and is provided with outwardly extending radial arms or stub shafts 19. The end of the propeller shaft just beyond the point of offset of said spider is screwthreaded and provided with a nut 20 of sufficient diameter to overlap the shoulder formed by said offset, against which said nut is tightened to hold the same in place.

Surrounding the spider sleeve 17, with suitable bushings or bearing metal 21 interposed between them, is the elongated hub 22 of an outwardly or forwardly facing bevel gear 23 that is rotatable on said spider sleeve. Mounted on each of the radial arms of the spider is a bevel pinion member 24 with teeth 25 that mesh with said bevel gear 23. This same pinion member 24 has a second series of teeth 26 which mesh with a second bevel gear 27 that faces inwardly or backwardly and is riveted or otherwise fixed to a ring-shaped member 28 that has a cylindrical hub 29 which extends into the cylindrical chamber or pocket bearing in the enlarged forward end of the spider member with spiral roller bearings 30 interposed between them. As illustrated in the drawing, the ring-shaped member 28 is bolted or otherwise fastened to the end member 31 of a universal joint of common type with a flat ring 32 interposed between them. These last mentioned ring members 31 and 32 are fastened, as by cap screws 33, to a cylindrical casing or housing member 34 whose rear end is reduced to a diameter very slightly in excess of the diameter of the hub of the bevel gear 23. Suitable bearing metal 35 is interposed between the radially disposed portion of the bevel gear 23 and the housing 34, so as to enable the said gear to support the trust of the pinion gear thereon. The rear end of said housing extends rearwardly past the forward end of the cylindrical housing 12 which is mounted on the nosing of the axle housing, and the channel between them is closed by a grease or oil ring 35ª of suitable type.

The rear end of said housing is provided with notches or lugs 36 for cooperation with a lug or lugs mounted on the forward or outer face of a clutch ring 37 that is slidably mounted on the hub of the rear bevel gear 23; and the rear or inner face of said slidable clutch ring is provided with a lug or lugs in position to cooperate with a lug or lugs 38 provided therefor on the inner face of said mounting stationary housing 12. The clutch ring is splined to the hub of the rear bevel gear 23 so as to turn therewith and still be slidable longitudinally thereon. The outer side of said clutch ring has a circumferential groove or channel 39 formed therein to receive an actuating pin 40 in such manner as to permit rotation and longitudinal movement of said ring without affecting their engagement. A suitable arrangement for actuating said pin is illustrated in the drawing, wherein the pin is positioned eccentrically on the end of a rock shaft 41 that passes through a hole in the mounting sleeve and is journaled in a supporting member 42 that is secured to said mounting sleeve. This rock shaft is provided with an arm 43 to which is pivotally connected an actuating rod 44 for operating the same. The arrangement is such that when the clutch sleeve is slid forwardly, its rear lug is disengaged from the lugs of the stationary housing 12 or other fixed part and its forward lug engages the notch or lug provided therefor in the rear end of the housing 34 that is fixed to the universal joint of the driving shaft, with the result that the rear bevel gear 23 and the rotatable housing 34 are temporarily secured together so as to turn in unison. This constitutes the direct drive. When the clutch ring is shifted to its rear position, it is disengaged from the rotatable housing 34 and the rear lug of the clutch ring engages the lugs on the stationary housing 12 that is fixed to the nosing of the differential carrier, with the result that said rear bevel gear 23 is disengaged from the rotatable housing and becomes temporarily fixed to the stationary housing. In consequence of this arrangement, the rear bevel gear 23 is rendered temporarily stationary, while the movement of the opposed bevel gear 27 continues and is transmitted in a planetary manner through the bevel pinions to their spider and thence to the driven shaft section to which said spider is keyed.

Obviously the velocity ratio of the driven shaft section relative to the driving shaft section depends on the ratio of the number of teeth of one of said gears to the number of teeth of the other gear and also upon the ratio of the number of teeth that each spider pinion member has in the series that engages the driving gear to the number of teeth that the same spider pinion member has in the series that engages the driven gear. Consequently, by suitably proportioning the number of teeth of the driving and driven gears and of the intermediate spider pinion members, the driven shaft section may be driven at higher or lower speed than the driving shaft section.

When two meshing gears are running together, they emit a musical note corresponding to the number of contacts per second made by their intermeshing teeth; and in order to prevent undue noise, it is desirable to prevent every set of intermeshing gear teeth from contacting at the same rate as any other set. It is a great advantage of the present construction that the spider pinion members have two series of teeth of different pitch, one series meshing with the driving gear and the other meshing with the gear 23 which is stationary or driven according to the engagement of the clutch ring. As the two series of teeth are of different pitch, each series will produce a different musical note from that of the other and the gearing will be less noisy than would be the case if the same series of pinion teeth engaged both the driving and driven gears. Except for the matter of noise, the spider pinion members may be made with a single series of teeth that engage both bevel gears.

The construction above described has the great advantage that it is so compact, small and light and has its driven and driving shafts so alined that it is adapted for location at almost any place desired in the power transmission system. In obtaining this great advantage, the shaft sections are alined, and the hub of the spider that is mounted on the driven shaft is formed into a pocket bearing for the end of the driving shaft; and the housing for the gearing is secured directly to the end plate of the differential of the universal joint, whereby the overall length of the construction is greatly shortened and the overall width is very slightly more than the width of the universal joint.

What I claim is:

1. The combination with an automotive axle having a propeller shaft of a two speed drive therefor, said drive comprising a universal joint, a driving shaft fixed to said universal joint and having a bevel gear fixed thereto, said propeller shaft alined therewith, a spider having an elongated hollow hub fixed to said driven propeller shaft and forming a pocket bearing for said driving shaft and having bevel pinion members thereon, a bevel gear rotatably mounted on the extended hub of said spider and releasable means whereby said last mentioned gear may be locked to said universal joint and to a stationary part alternately, both of said bevel gears engaging said pinion members.

2. A two-speed drive comprising a driving shaft having a bevel gear fixed thereto, a driven shaft in alinement with said driving shaft and having a bevel gear rotatably mounted thereon, a spider fixed to said driven shaft and having bevel pinions thereon intermeshing with both of said bevel gears, and releasable means for mechanically locking said bevel gears together, said means comprising a clutch ring slidably keyed to the second mentioned bevel gear and having its opposite sides adapted respectively to engage a member fixed to the driving shaft and a stationary member.

3. A two-speed drive comprising a driving shaft having a bevel gear fixed thereto, a driven shaft alined therewith, a spider having an extended hub fixed to said driven shaft and having pinion members thereon, a bevel gear rotatably mounted on the extended hub of said spider, and releasable means whereby said last mentioned gear may be locked to said driving shaft, each of said pinion members having two series of teeth the teeth of one series engaging one of said gears and the teeth of the other series engaging the other gear and being unequal in number to the number of teeth of the first series.

4. A two-speed drive comprising a driving shaft having a bevel gear fixed thereto, a driven shaft alined therewith, a spider having an extended hub fixed to said driven shaft and having pinion members thereon, a bevel gear rotatably mounted on the extended hub of said spider, and releasable means whereby said last mentioned gear may be locked to said driving shaft, each of said pinion members having two series of teeth of different pitch, the teeth of one series engaging one of said gears and the teeth of the other series engaging the other gear.

5. A two-speed drive comprising a driving shaft having a bevel gear fixed thereto, a driven shaft alined therewith, a spider having an extended hub fixed to said driven shaft and having pinion members thereon, a bevel gear rotatably mounted on the extended hub of said spider, and releasable means whereby said last mentioned gear may be locked to said driving shaft, each of said pinion members having two series of teeth of different pitch, the teeth of one series engaging one of said gears and the teeth of the other series engaging the other gear, and the two gears having unequal numbers of teeth.

6. In combination with an automotive axle having a stationary nosing, a propeller shaft rotatably mounted in said nosing, a sleeve fixed to said nosing concentric with said propeller shaft, a spider having an elongated hub portion extending into said sleeve and fixed on said propeller shaft, a bevel gear having an elongated hub extending into said sleeve and rotatably mounted on the elongated portion of said spider hub, a second bevel gear opposite said first mentioned gear and having a hub portion that has a bearing in the hub of said spider, a driving member to which said second gear is fixed, a casing fixed to said second gear and having a hub portion inside of said sleeve, a roller bearing in said nosing for said casing hub portion, bevel pinion members on said spider engaging said gears, and means for locking said second gear to said casing and to said nosing alternately.

7. In combination with an automotive axle having a stationary nosing, a propeller shaft rotatably mounted in said nosing and a sleeve fixed to said nosing concentric with said propeller shaft, of a rotatable driving member and means for transmitting motion therefrom to said propeller shaft, said means comprising a casing fixed to said driving member and releasable means for locking said casing to said propeller shaft and to said sleeve alternately, a spider fixed on said propeller shaft and having an elongated hub portion extending into said sleeve, a bevel gear having an elongated hub rotatably mounted on the elongated portion of said spider hub, a second bevel gear fixed to said driving member opposite to said first mentioned gear and having a hub portion that has a bearing in the hub of said spider, and bevel pinions on said spider engaging said gears, said casing having a hub portion rotatably mounted inside of said sleeve.

8. In combination with an automotive axle having a stationary nosing, a propeller shaft rotatably mounted in said nosing and a sleeve fixed to said nosing concentric with said propeller shaft, of a rotatable driving member and means for transmitting motion therefrom to said propeller shaft, said means comprising a universal joint, a casing fixed to one member of said joint, and releasable means for locking said casing to said propeller shaft and to said sleeve alternately, a spider fixed on said propeller shaft and having an elongated hub portion extending into said sleeve, a bevel gear having an elongated hub rotatably mounted on the elongated portion of said spider hub, a second bevel gear fixed to said universal joint member opposite to said first mentioned gear and having a hub portion that has a bearing in the hub of said spider, and bevel pinions on said spider engaging said gears, said casing having a hub portion rotatably mounted inside of said sleeve.

Signed at Detroit, Michigan, this 24th day of June, 1929.

MATHEW B. MORGAN.